July 13, 1937.   O. N. OWEN   2,087,113
HOLDER
Filed Jan. 16, 1937
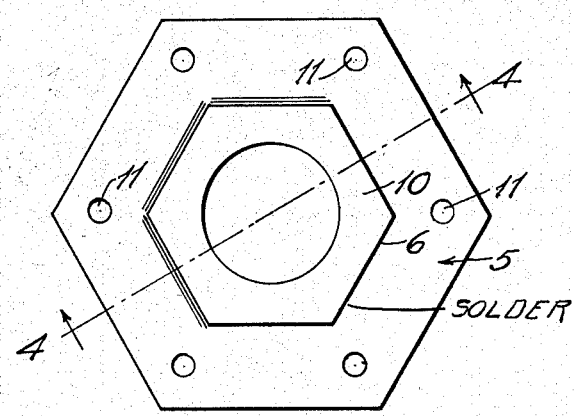
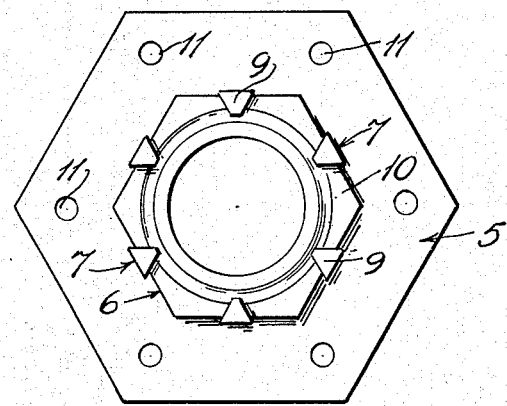
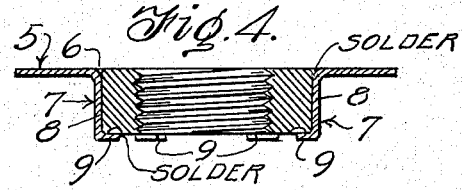
Inventor
O. N. Owen,
By Kimmel & Crowell
Attorneys Patented July 13, 1937

2,087,113

UNITED STATES PATENT OFFICE 2,087,113

HOLDER

Obadiah N. Owen, Phoenix, Ariz., assignor of fifty per cent to Henry H. Rollins, Phoenix, Ariz.

Application January 16, 1937, Serial No. 121,003

2 Claims. (Cl. 85—32)

This invention relates to a holder for supporting a threaded element employed for connecting a threaded rod or an air, water, gas or liquid conducting pipe to a tank, box, boiler, container or other object, but it is more particularly designed for holding nuts of various shapes and sizes employed in making water pipe connections. The invention has for its object to provide, in a manner as hereinafter set forth, a holder for the purpose referred to which is simple in its construction and arrangement, strong, durable, compact, capable of having a nut expeditiously positioned therein, thoroughly efficient in its use, capable of being conveniently anchored to the object to which the pipe is to be connected, conveniently handled and positioned at the desired place where the connection is to be had, and inexpensive to manufacture.

To the above ends essentially and to others which may hereinafter appear, the invention consists of the novel construction, combination and arrangement of parts as will be more specifically referred to and are as illustrated in the accompanying drawing wherein is shown an embodiment of the invention, but it is to be understood that changes, variations and modifications may be resorted to which fall within the scope of the invention as claimed.

The holder is illustrated by way of example as polygonal in form for employment in connection with nuts of like contour.

In the drawing:

Figure 1 is an elevation looking towards the outer face of the holder carrying a nut, Figure 2 is a fragmentary view in horizontal section of the wall of a container showing the adaptation therewith of the holder carrying the nut which is to be employed for connecting a pipe with a container, Figure 3 is a rear elevation of the holder carrying the nut, and Figure 4 is a section on line 4—4, Figure 1.

The holder comprises a plate 5 formed with an opening 6 of a size for the passage therethrough of the nut to be held. As illustrated, plate 5 is shown as of polygonal contour and the opening 6 conforms in contour to that of the plate. Formed integral with the plate 5 is a series of inwardly extending tapered angle-shaped arms 7 corresponding in number to the number of inner edge portions of plate 5. Each arm 7 consists of a pair of legs 8, 9. The leg 8 at its outer end merges into an inner edge portion of plate 5 and said arm 8 at its point of mergence with such edge portion corresponds in width to the length of the latter. The arm 9 extends inwardly at right angles to the inner end of the arm 8. The length of leg 9 is materially less than the length of leg 8. The legs 9 form a series of radially disposed spaced supports or abutments for the nut 10. The length of the latter is such that it will extend from the legs 9 to the outer face of the plate 5.

The plate 5 is formed with a series of spaced openings 11 for the passage of rivets 12 to anchor plate 5 against the wall 13 of a container 14 to which is to be coupled a pipe, not shown, by the nut 10. The opening 6 of plate 5 is of less area than the opening 15 in the wall 13. The plate 5 when in the position shown in Figure 2, extends partly across the opening 15 and the arms 7 extend through opening 15 in spaced relation with respect to the wall of the latter.

After the nut 10 has been seated in the holder, the legs 9 are soldered to the nut. After the holder with the nut has been positioned relative to the wall 13 for the purpose of connecting the pipe with the container, the nut 10 is soldered to a plate 5 at the point indicated in the drawing and the plate 5 is soldered to wall 13 at the point indicated in the drawing. By this arrangement a water tight and almost nonbreakable connection is set up relative to the container.

What I claim is:

1. A holder for a threaded connection element, said holder comprising a plate formed with a central opening of polygonal contour to correspond to the contour of a polygonal-shaped connection element and for the passage of said element, a plurality of inwardly extending arms, each integral at its outer end with an edge portion of said opening, each of said arms being of angle-shape in cross section to provide an inwardly extending abutment at the inner end of the arms for the inner face of said element, and said plate being provided between said central opening and its outer edge with a plurality of openings for the passage of holdfast devices for anchoring the plate to the object with which the connection is made.

2. A holder for a threaded connection element, said holder comprising a plate formed with a central opening of polygonal contour to correspond to the contour of a polygonal-shaped connection element and for the passage of said element, a plurality of inwardly extending arms, each integral at its outer end with an edge portion of said opening, each of said arms being of angle shape in cross section to provide an inwardly extending abutment at the inner end of the arms for the inner face of said element, and said plate being provided between said central opening and its outer edge with a plurality of openings for the passage of holdfast devices for anchoring the plate to the object with which the connection is made, each of said arms being of tapered contour throughout, the outer end of each of said arms corresponding in width to the length of an edge portion of said central opening.

OBADIAH N. OWEN.